United States Patent
Moriya et al.

(10) Patent No.: US 10,993,179 B2
(45) Date of Patent: Apr. 27, 2021

(54) WIRELESS COMMUNICATION METHOD AND SYSTEM INCLUDING WIRELESS RELAY DEVICES THAT DETERMINE INFORMATION ABOUT PRESENCE AND ABSENCE OF A RESPONSE SIGNAL FROM A WIRELESS TERMINAL

(71) Applicant: YAMAHA CORPORATION, Hamamatsu (JP)

(72) Inventors: Tadahiko Moriya, Hamamatsu (JP); Hirokazu Suzuki, Hamamatsu (JP); Kazushi Tamai, Iwata (JP)

(73) Assignee: YAMAHA CORPORATION, Hamamatsu (JP)

( * ) Notice: Subject to any disclaimer, the term of this patent is extended or adjusted under 35 U.S.C. 154(b) by 25 days.

(21) Appl. No.: 16/193,200

(22) Filed: Nov. 16, 2018

(65) Prior Publication Data
US 2019/0090183 A1 Mar. 21, 2019

Related U.S. Application Data

(63) Continuation of application No. PCT/JP2016/064709, filed on May 18, 2016.

(51) Int. Cl.
*H04W 48/20* (2009.01)
*H04B 17/318* (2015.01)
(Continued)

(52) U.S. Cl.
CPC ............ *H04W 48/20* (2013.01); *H04B 7/14* (2013.01); *H04B 7/2606* (2013.01);
(Continued)

(58) Field of Classification Search
CPC ..... H04W 48/20; H04W 76/10; H04W 76/15; H04W 48/16; H04W 84/047; H04W 84/12; H04W 76/14; H04W 88/04; H04W 36/00; H04W 40/00; H04W 48/00; H04W 88/00; H04B 7/2606; H04B 17/318; H04B 7/14
See application file for complete search history.

(56) References Cited

U.S. PATENT DOCUMENTS

| | | | |
|---|---|---|---|
| 2004/0228304 A1* | 11/2004 | Riedel | H04W 36/26 370/332 |
| 2010/0246417 A1 | 9/2010 | Cheng et al. | |
| 2015/0163836 A1* | 6/2015 | Kobayashi | H04W 48/06 370/329 |

FOREIGN PATENT DOCUMENTS

| | | |
|---|---|---|
| JP | 2009531874 A | 9/2009 |
| JP | 2009246499 A | 10/2009 |

(Continued)

OTHER PUBLICATIONS

Translation of JP 2015201752A cited in IDS, by Mineoi et al., published Nov. 12, 2015.*

(Continued)

*Primary Examiner* — Nishant Divecha
(74) *Attorney, Agent, or Firm* — Rossi, Kimms & McDowell LLP

(57) ABSTRACT

A wireless communication method includes receiving a broadcast signal from a wireless terminal, comparing a receiving intensity of the received broadcast signal with a set
(Continued)

value, and transmitting to the wireless terminal a first signal indicating that the wireless terminal can start connection depending on a result of the comparison.

14 Claims, 9 Drawing Sheets

(51) Int. Cl.
| | | |
|---|---|---|
| *H04B 7/14* | (2006.01) | |
| *H04W 76/10* | (2018.01) | |
| *H04B 7/26* | (2006.01) | |
| *H04W 76/15* | (2018.01) | |
| *H04W 84/12* | (2009.01) | |
| *H04W 48/16* | (2009.01) | |
| *H04W 84/04* | (2009.01) | |

(52) U.S. Cl.
CPC .......... *H04B 17/318* (2015.01); *H04W 76/10* (2018.02); *H04W 76/15* (2018.02); *H04W 48/16* (2013.01); *H04W 84/047* (2013.01); *H04W 84/12* (2013.01)

(56) References Cited

FOREIGN PATENT DOCUMENTS

| JP | 2014212417 A | 11/2014 |
|---|---|---|
| JP | 2015115757 A | 6/2015 |
| JP | 2015201752 A | 11/2015 |

OTHER PUBLICATIONS

Office Action issued in Japanese Appln. No. 2018-517989 dated Jul. 9, 2019. Partial English translation provided.

English translation of Written Opinion issued in Intl. Appln. No. PCT/JP2016/064709 dated Aug. 9, 2016, previously cited in IDS filed Nov. 16, 2018.

International Search Report issued in Intl. Appln. No. PCT/JP2016/064709 dated Aug. 9, 2016. English translation provided.

Written Opinion issued in Intl. Appln. No. PCT/JP2016/064709 dated Aug. 9, 2016.

Office Action issued in Japanese Appln. No. 2018-517989 dated Feb. 4, 2020. English translation provided.

* cited by examiner

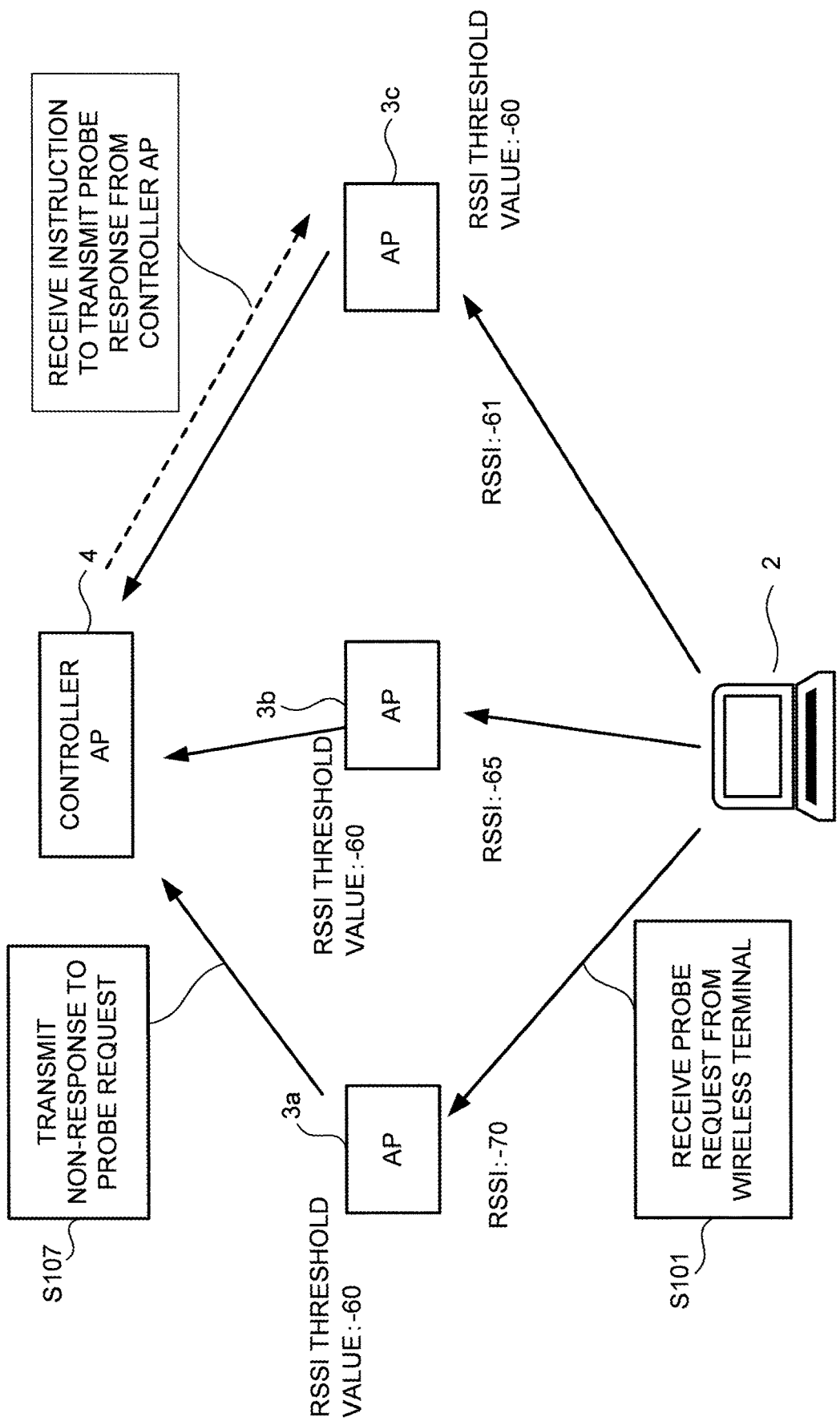

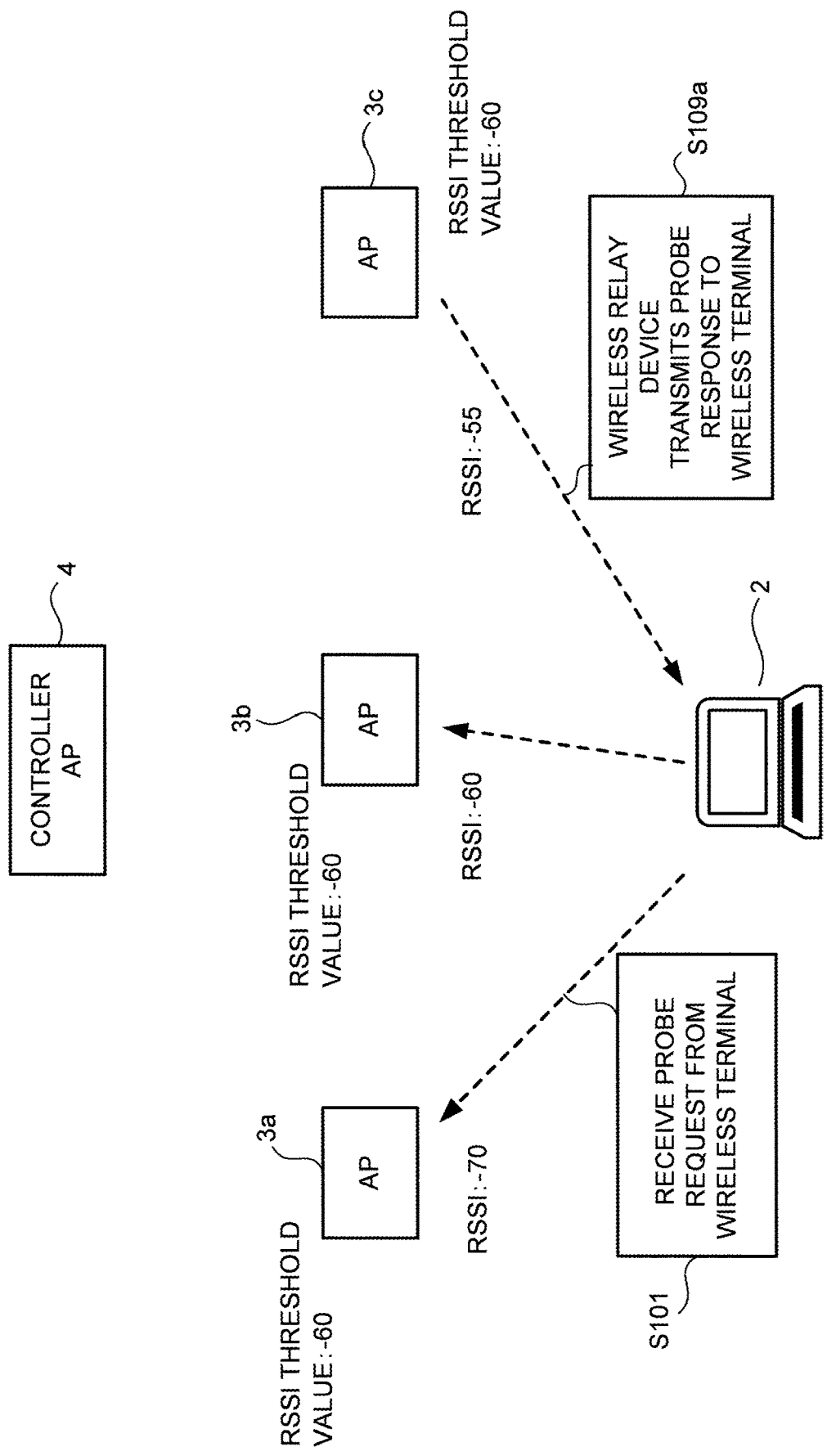

WIRELESS COMMUNICATION METHOD AND SYSTEM INCLUDING WIRELESS RELAY DEVICES THAT DETERMINE INFORMATION ABOUT PRESENCE AND ABSENCE OF A RESPONSE SIGNAL FROM A WIRELESS TERMINAL

CROSS-REFERENCE TO RELATED APPLICATIONS

This application is a U.S. continuation application filed under 35 U.S.C. § 111(a), of International Application No. PCT/JP2016/064709, filed on May 18, 2016, the disclosures of which are incorporated by reference.

FIELD

The present invention relates to a wireless communication method.

BACKGROUND

Conventionally, when there are a plurality of access points, a method of selecting the access point to be connected based on a communication quality between a wireless terminal and its communication partner has been used to implement highly efficient communication. National Publication of International Patent Application No. 2009-531874, for example, proposes a relay node which performs such a method.

SUMMARY

According to an aspect of the present invention, there is provided a wireless communication method including receiving a broadcast signal from a wireless terminal, comparing a receiving intensity of the received broadcast signal with a set value, and transmitting to the wireless terminal a first signal indicating that the wireless terminal can start connection depending on a result of the comparison.

According to an aspect of the present invention, there is provided a wireless communication method including receiving from a plurality of wireless relay devices information about presence or absence of a response signal and information about receiving intensities of broadcast signals respectively received from a wireless terminal by the plurality of wireless relay devices, and transmitting an instruction to transmit a first signal indicating that the wireless terminal can start to connect to at least one of the plurality of wireless relay devices in response to the received information.

According to an aspect of the present invention, there is provided a wireless communication method including operating one, a function of which has been stopped, of a first function and a second function corresponding to a wireless device and stopping the other function in response to a switching instruction, wherein the wireless device according to the first function receives a broadcast signal from a wireless terminal, compares a receiving intensity of the received broadcast signal with a set value, and transmits to the wireless terminal a first signal indicating that the wireless terminal can start connection depending on a result of the comparison, and the wireless device according to the second function receives from a plurality of wireless relay devices information about presence or absence of a response signal and information about receiving intensities of broadcast signals respectively received from a wireless terminal by the plurality of wireless relay devices, and transmits an instruction to transmit the first signal to at least one of the plurality of wireless relay devices in response to the received information.

According to an aspect of the present invention, there is provided a wireless communication method performed by a wireless communication system, the wireless communication system including a wireless control device and a plurality of wireless relay devices, wherein each of the wireless relay devices receives a broadcast signal from a wireless terminal, compares a receiving intensity of the received broadcast signal with a set value, and transmits to the wireless terminal a first signal indicating that the wireless terminal can start connection depending on a result of the comparison, the wireless control device receives from the plurality of wireless relay devices information about presence or absence of a response signal and information about receiving intensities of broadcast signals respectively received from the wireless terminal by the plurality of wireless relay devices, and transmits an instruction to transmit a first signal indicating that the wireless terminal can start to connect to at least one of the plurality of wireless relay devices in response to the received information, and each of the wireless relay devices transmits to the wireless control device the information about the presence or absence of the response signal and the information about the receiving intensities of the broadcast signals respectively received from the wireless terminal by the plurality of wireless relay devices, and the wireless relay device which has received the instruction to transmit the first signal from the wireless control device transmits to the wireless terminal a signal indicating that the wireless terminal can start connection regardless of the result of the comparison upon receiving the broadcast signal from the wireless terminal.

BRIEF DESCRIPTION OF DRAWINGS

FIG. 6A is a block diagram illustrating a part of an operation of the wireless relay devices according to the one embodiment of the present invention;

FIG. 6B is a block diagram illustrating a part of the operation of the wireless relay devices according to the one embodiment of the present invention.

DESCRIPTION OF EMBODIMENTS

Figure 1:
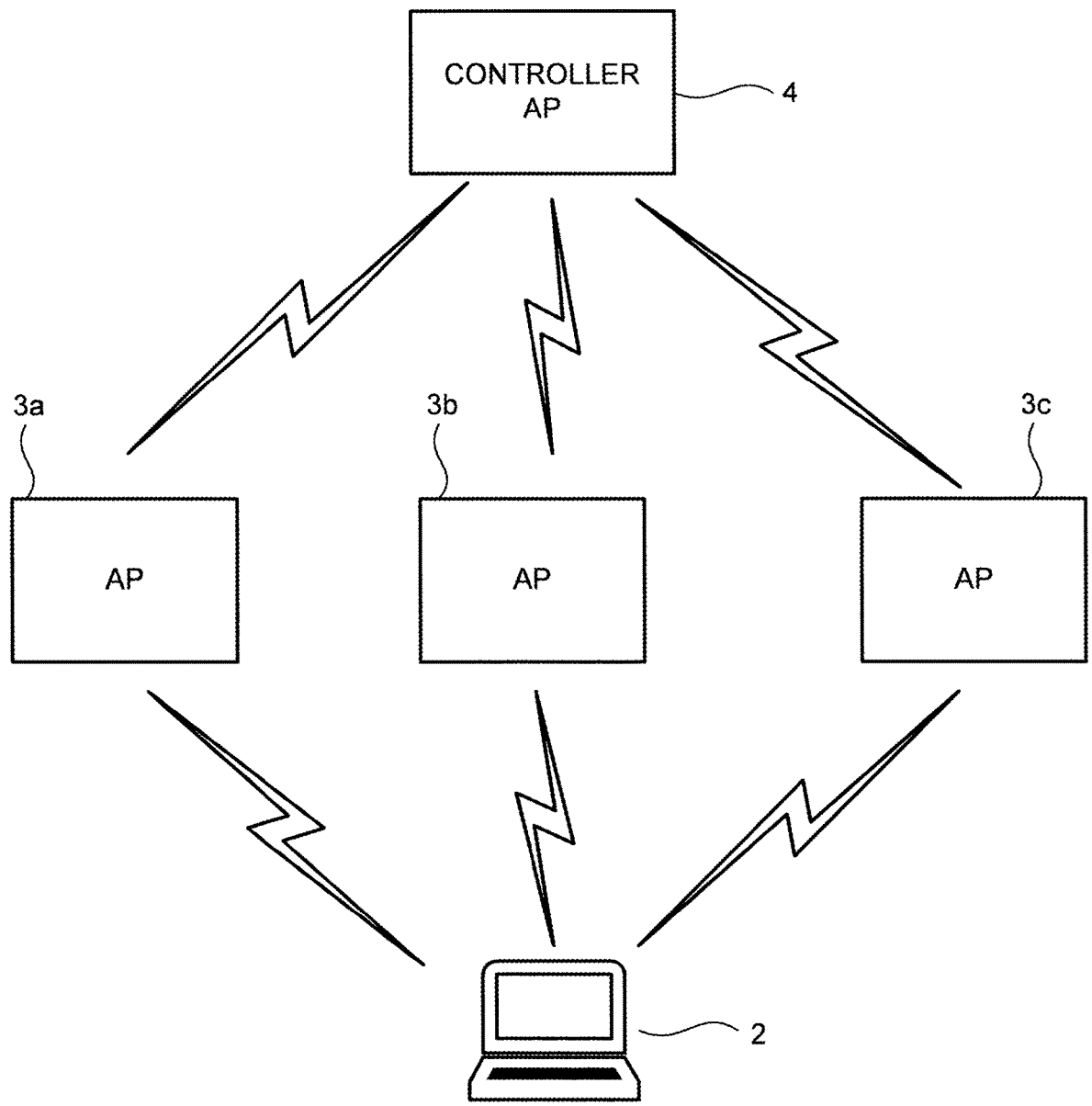
FIG. 1 is a conceptual view illustrating a wireless communication system according to one embodiment of the present invention.

One embodiment of the present invention will be described in detail below with reference to the drawings.

Embodiments described below are examples of the embodiment of the present invention, and the present invention is not limited to the embodiments. In the drawings referred to in the present embodiment, identical units or units having similar functions are respectively assigned identical or similar reference symbols (reference numerals followed by A, B, or the like), and repetitive description may be omitted.

In a technique disclosed in National Publication of International Patent Application No. 2009-531874, when a wireless terminal connects to an access point, determination of an optimum path in a communication partner or a crossover node is required. Therefore, there is an overhead before completion of the connection. A relay node is required. Accordingly, a system configuration becomes complicated.

According to an embodiment of the present invention, highly efficient communication is implemented in a simpler configuration, to solve a problem associated with the above-described conventional technique.

A wireless communication system 1 will be described with reference to FIG. 1. FIG. 1 is a conceptual view illustrating a wireless communication system 1 according to one embodiment of the present invention.

The wireless communication system 1 includes a plurality of wireless relay devices 3a, 3b, and 3c and a wireless control device 4. If the wireless relay devices 3a, 3b, and 3c need not be particularly distinguished, the wireless relay devices 3a, 3b, and 3c are simply referred to as "wireless relay devices 3". Although the number of wireless relay devices 3 is three in the following description, the number of wireless relay devices 3 may be one or more other than three.

Examples of the wireless terminal 2 include a mobile communication terminal device and an information processing terminal device. An example of the mobile communication terminal device is a multifunctional mobile phone, a mobile phone, or a PDA (personal digital assistant). An example of the information processing terminal device is a personal computer having a communication function and a calculation function. The wireless terminal 2 includes a browser as a display control function, and includes, for example, a communication control unit which performs communication control among a CPU (central processing unit), a memory, and the wireless relay devices 3. Further, the wireless terminal 2 can include operation input devices such as a mouse, a keyboard, and a touch panel and a display device.

The wireless relay device 3 is an access point (AP) of a wireless LAN (local area network) in this example. The wireless relay device 3 may be a router on the wireless LAN. Although a wireless control device 4 controls the plurality of wireless relay devices 3, the wireless control device 4 and the wireless relay devices 3 may be the same device. That is, the wireless relay device 4 may be an access point or a router on the wireless LAN. The wireless control device 4 may be referred to as a controller access point (controller AP) in the sense of having a function of controlling the plurality of wireless relay devices 3. On the other hand, the plurality of wireless relay devices 3 controlled by the controller access point may be referred to as a member access point. The wireless terminal 2 communicates with another wireless terminal or connects to another network via the wireless relay devices 3.

[Configuration of Wireless Relay Device]

Figure 2:
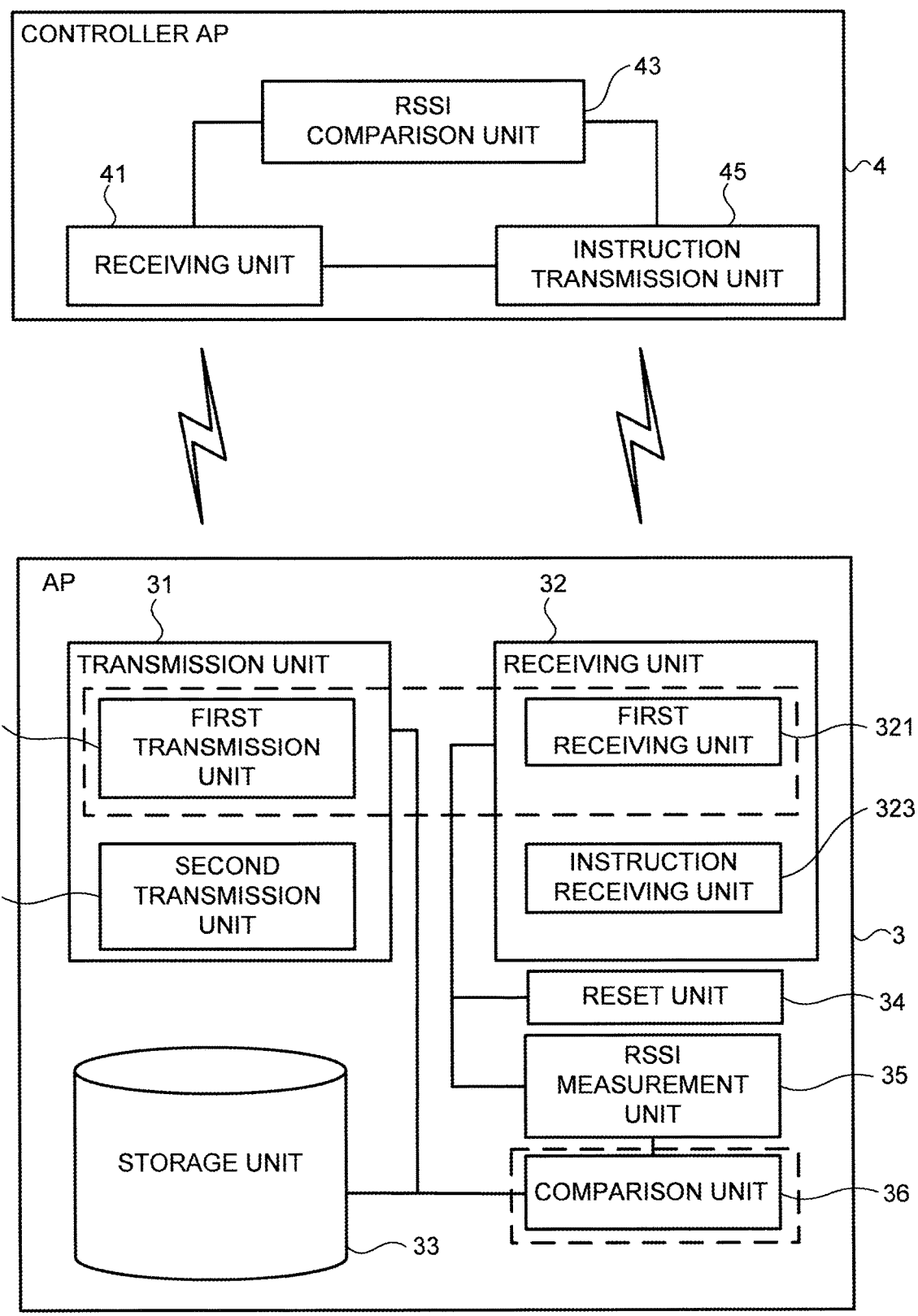
FIG. 2 is a block diagram illustrating respective configurations of a wireless relay device and a wireless control device according to the one embodiment of the present invention.

The wireless relay device 3 and the wireless control device 4 will be described with reference to FIG. 2. FIG. 2 is a block diagram illustrating respective configurations of the wireless relay device 3 and the wireless control device 4 according to the one embodiment of the present invention. First, the configuration of the wireless relay device 3 will be described.

The wireless relay device 3 includes a transmission unit 31, a receiving unit 32, a storage unit 33, a reset unit 34, an RSSI measurement unit 35, and a comparison unit 36. The transmission unit 31 includes a first transmission unit 311 and a second transmission unit 313. The receiving unit 32 includes a first receiving unit 321 and an instruction receiving unit 323.

The first receiving unit 321 receives a search signal from the wireless terminal 2. In this example, the search signal is a Probe Request. The search signal is broadcast to a large indefinite number of wireless relay devices 3 from the wireless terminal 2. The Probe Request may include an identifier for identifying the specific wireless relay device 3. In this example, the search signal is a Probe Request for a Non Wildcard SSID (service set identifier).

The RSSI measurement unit 35 measures a receiving intensity of the received Probe Request (search signal). The receiving intensity is measured by an RSSI (Received Signal Strength Indication/Received Signal Strength Indicator). The RSSI is a circuit or a signal for measuring the intensity of a signal received by a wireless communication device.

The comparison unit 36 compares the receiving intensity of the received Probe Request with a previously set value. The receiving intensity of the received Probe Request is a receiving intensity measured by the RSSI measurement unit 35. The previously set value may be directly set in each of the wireless relay devices 3 by a user. The previously set value may be set in each of the plurality of wireless relay devices 3 from the wireless control device 4. The previously set values can be collectively set when respectively set in the plurality of wireless relay devices 3 from the wireless control device 4. In this example, the comparison unit 36 determines whether the receiving intensity measured by the RSSI measurement unit 35 is the previously set value or more. Therefore, the previously set value can also be referred to as a previously set RSSI threshold value.

The comparison unit 36 may include a calculation processing circuit such as a CPU. The comparison unit 36 executes a program stored in the storage unit 33 using the CPU (a computer), to implement the above-described comparison function. Some or all of components implementing the function are not necessarily implemented by software by executing the program but may be implemented by hardware.

The previously set RSSI threshold value may be stored in the storage unit 33. The storage unit 33 is a storage device such as a nonvolatile memory or a hard disk. The storage unit 33 includes a storage area storing an application program for implementing various functions, such as the above-described program, and a storage area storing setting information set by setting processing. The program may be executable by the computer, and may be provided while being stored in a computer readable recording medium such as a magnetic recording medium, an optical recording medium, a magnetooptical recording medium, or a semiconductor memory. In this case, the wireless relay device 3 may include a device which reads the recording medium. The previously set RSSI threshold value may be held in a server on a network. If the threshold value is held in the server on the network, the wireless relay device 3 may read out the threshold value once from the server and store and hold the read threshold value in the storage unit 33. The wireless relay device 3 may compare the receiving intensity of the received Probe Request with the threshold value held in the server every comparison by the comparison unit 36.

Depending on a result of the comparison by the comparison unit 36, the first transmission unit 311 transmits to the wireless terminal 2 a signal indicating that the wireless terminal 2 can start to connect to the wireless relay device 3. Transmitting the signal indicating that the wireless terminal 2 can start to connect to the wireless relay device 3 means that the first transmission unit 311 transmits a response signal (a Probe Response) to the wireless terminal 2 or the first transmission unit 311 transmits a connection permission signal to the wireless terminal 2. In the following description, the first transmission unit 311 transmits the response signal (Probe Response) to the wireless terminal 2 as an example.

If the comparison unit 36 determines that the receiving intensity measured by the RSSI measurement unit 35 is the previously set RSSI threshold value or more, the first transmission unit 311 transmits the Probe Response to the wireless terminal 2. On the other hand, if the comparison unit 36 determines that the receiving intensity measured by the RSSI measurement unit 35 is less than the previously set RSSI threshold value, the first transmission unit 311 does not transmit the Probe Response to the wireless terminal 2.

The second transmission unit 313 transmits information about the presence or absence of the response signal (Probe Response) to the wireless control device 4. More specifically, if the first transmission unit 311 transmits the Probe Response to the wireless terminal 2, the second transmission unit 313 transmits a signal indicating that the response signal is present to the wireless control device 4. On the other hand, if the first transmission unit 311 does not transmit the Probe Response to the wireless terminal 2, the second transmission unit 313 transmits a signal indicating that the response signal is absent (a non-response) to the wireless control device 4.

After the second transmission unit 313 has transmitted to the wireless control device 4 the information about the presence or absence of the response signal (Probe Response), the instruction receiving unit 323 receives from the wireless control device 4 an instruction to transmit the response signal (a response permission). That is, the instruction receiving unit 323 receives from the wireless control device 4 an instruction signal for transmitting the Probe Response to the wireless terminal 2. The wireless relay device 3 which receives the instruction signal from the wireless control device 4 includes any one or more of the plurality of wireless relay devices 3. In this example, the wireless relay device 3c is described as having received the instruction signal. When the wireless relay device 3c among the plurality of wireless relay devices 3 is selected, the wireless relay device 3c may set a flag (a response permission flag) to be on. That is, the wireless relay device 3c has a 1-bit register in its inner part, and sets a data value "1" in the register upon receiving the instruction signal.

Upon receiving the instruction to transmit the response signal from the wireless control device 4, the first transmission unit 311 transmits a signal indicating a permission for the wireless terminal 2 to start to connect to the wireless relay device 3 regardless of the result of the comparison by the comparison unit 36, that is, regardless of whether the receiving intensity measured by the RSSI measurement unit 35 is the previously set RSSI threshold value or more. When the first receiving unit 311 receives the Probe Request from the wireless terminal 2 with the instruction to transmit the response signal received from the wireless control device 4 by the instruction receiving unit 323, the first transmission unit 311 needs to transmit the Probe Response to the wireless terminal 2. In this case, a state where the instruction receiving unit 323 has received the instruction to transmit the response signal from the wireless control device 4 can also be referred to as a "forced response state".

After the instruction receiving unit 323 has received the instruction signal, the reset unit 34 performs resetting if a predetermined condition is not satisfied. The resetting means that a state where the first transmission unit 311 can transmit the Probe Response is changed to a state where the instruction receiving unit 323 has not received the instruction signal yet. The predetermined condition is that connection to the wireless terminal 2 is started before a predetermined period elapses since the instruction receiving unit 323 received the instruction signal. If the wireless terminal 2 cannot start to connect to the wireless relay device 3c even if the predetermined period elapses, a communication environment with the wireless relay device 3c may have deteriorated due to movement of the wireless terminal 2, for example. In such a case, a communication environment with the other wireless relay devices 3 (e.g., the wireless relay devices 3a and 3b) may become better. Therefore, resetting is required from a state where the wireless terminal 2 can connect to only the wireless relay device 3c to a state where the specific wireless relay device 3 among all the wireless relay devices 3 has not received the instruction signal yet. When the resetting is thus performed, the flag (the response permission flag) of the wireless relay device 3c is set to be off. That is, the data value in the register inside the wireless relay device 3c is set to "0".

To determine whether the predetermined period has elapsed, a starting point of the predetermined period may be recorded. The starting point of the predetermined period is a time point where the instruction receiving unit 323 in the wireless relay device 3 has received the instruction signal. The storage unit 33 may store a time stamp by acquiring the time stamp at the receiving time point.

Although the configuration of the wireless relay device 3 has been described above, the wireless relay device 3 need not include some of all the above-described components. A minimum configuration of the wireless relay device 3 includes the first receiving unit 321, the comparison unit 36, and the first transmission unit 311 which are enclosed by a broken line in FIG. 2. The other components can be added to the minimum configuration.

The transmission unit 31 may not only transmit signals respectively transmitted by the first transmission unit 311 and the second transmission unit 313 but also information about a frequency band (e.g., information such as 2.4 GHz or 5 GHz), identification information of each of the wireless relay devices 3, information about the number of wireless terminals 2 connected to each of the wireless relay devices 3, information about a channel usage rate of each of the wireless relay devices 3, information about a traffic on the wired side of each of the wireless relay devices 3, and identification information of the wireless terminal 2.

[Configuration of Wireless Control Device]

Then, the configuration of the wireless control device (controller access point) 4 will be described with continued reference to FIG. 2.

In this example, the wireless control device 4 includes a receiving unit 41, an RSSI comparison unit 43, and an instruction transmission unit 45.

The receiving unit 41 receives from the plurality of wireless relay devices 3 information about the presence or absence of a response signal and information about receiving intensities of search signals (Probe Requests) respectively received from the wireless terminal 2 by the plurality of wireless relay devices 3. In this example, the receiving unit 41 receives from the plurality of wireless relay devices 3a, 3b, and 3c information about whether the plurality of wireless relay devices 3a, 3b, and 3c have respectively responded to the Probe Requests from the wireless terminal 2. The receiving unit 41 receives from each of the plurality of wireless relay devices 3a, 3b, and 3c an RSSI value measured by the RSSI measurement unit 35 in the wireless relay device 3. The receiving unit 41 may receive information about a frequency band (e.g., information such as 2.4 GHz or 5 GHz), identification information of each of the wireless relay devices 3, information about the number of wireless terminals 2 connected to each of the wireless relay devices 3, information about a channel usage rate of each of the wireless relay devices 3, information about a traffic on the wired side of each of the wireless relay devices 3, and identification information of the wireless terminal 2.

The RSSI comparison unit 43 compares the respective RSSI values from the wireless relay devices 3 in response to the information received by the receiving unit 41. That is, if a signal indicating that there is no response signal (a non-response) has been received from all the wireless relay devices 3, the RSSI comparison unit 43 compares the received RSSI values from the wireless relay devices 3, and determines the highest RSSI value. On the other hand, if a signal indicating that there is a response signal has been received from at least one of the wireless relay devices 3, the RSSI comparison unit 43 does not perform such comparison.

The RSSI comparison unit 43 may also include a calculation processing circuit such as a CPU, like the comparison unit 36 in the wireless relay device 3. The RSSI comparison unit 43 executes a program stored in a storage unit (not illustrated) using the CPU (computer), to implement the above-described comparison function. Some or all of components implementing the function are not necessarily implemented by software by executing the program but may be implemented by hardware.

The instruction transmission unit 45 transmits an instruction to transmit a response signal to at least one of the plurality of wireless relay devices 3 in response to the information received by the receiving unit 41. If the RSSI values of the Probe Requests respectively received from the wireless terminal 2 by all the wireless relay devices 3 are less than a previously set RSSI value, the wireless control device 4 receives a signal indicating that there is no response signal (a non-response) from each of the wireless relay devices 3. If the signal indicating that there is no response signal has been thus received from each of the wireless relay devices 3, the instruction transmission unit 45 transmits the instruction to transmit the response signal to any one of the plurality of wireless relay devices 3.

The RSSI comparison unit 43 compares the RSSI values of the Probe Requests respectively received by the wireless relay devices 3, and determines the highest RSSI value. The instruction transmission unit 45 transmits the instruction to transmit the response signal to the wireless relay device 3c which has measured the highest RSSI value.

If it is determined that the RSSI values of the Probe Requests respectively received by the plurality of wireless relay devices 3 are the highest, the instruction transmission unit 45 may transmit the instruction to transmit the response signal to the plurality of wireless relay devices 3. After comparing respective channel usage rates of the wireless relay devices 3, the instruction transmission unit 45 may transmit the instruction to transmit the response signal to any one of the wireless relay devices 3. In this case, the wireless control device 4 may include a channel usage rate comparison unit (not illustrated) which compares the respective channel usage rates of the wireless relay devices 3 and determines the wireless relay device 3 having the lowest channel usage rate. In this case, the instruction transmission unit 45 transmits the instruction to transmit the response signal to the wireless relay device 3 having the lowest channel usage rate. If it is determined that the RSSI values of the Probe Requests respectively received by the plurality of wireless relay devices 3 are the highest, determination which of the wireless relay devices 3 is to be selected is not limited to a method of comparing the channel usage rates. The wireless control device 4 may compare the numbers of wireless terminals 2 respectively connected to the wireless relay devices 3 and select the wireless relay device 3 to which the smallest number of wireless terminals 2 have been connected, or may compare the respective traffics on the wired side of the wireless relay devices 3 and select the wireless relay device 3 having the low traffic.

On the other hand, if the RSSI values of the Probe Requests respectively received from the wireless terminal 2 by the wireless relay devices 3b and 3c are the previously set RSSI value or more, the wireless relay devices 3b and 3c respectively transmit Probe Responses to the wireless terminal 2. The wireless relay devices 3b and 3c each transmit a signal indicating that there is a response signal to the wireless control device 4. If the signal indicating that there is a response signal has been thus received from each of the wireless relay devices 3, the instruction transmission unit 45 does not transmit the instruction to transmit the response signal to the wireless relay device 3 because it has already been determined that the response signal is present.

Although the configuration of the wireless relay device 4 has been described above, the wireless relay device 4 need not include some of the above-described components. A minimum configuration of the wireless control device 4 includes the receiving unit 41 and the instruction transmission unit 45. The other components can be added to the minimum configuration.

[Operation of Wireless Relay Device]

Figure 3:
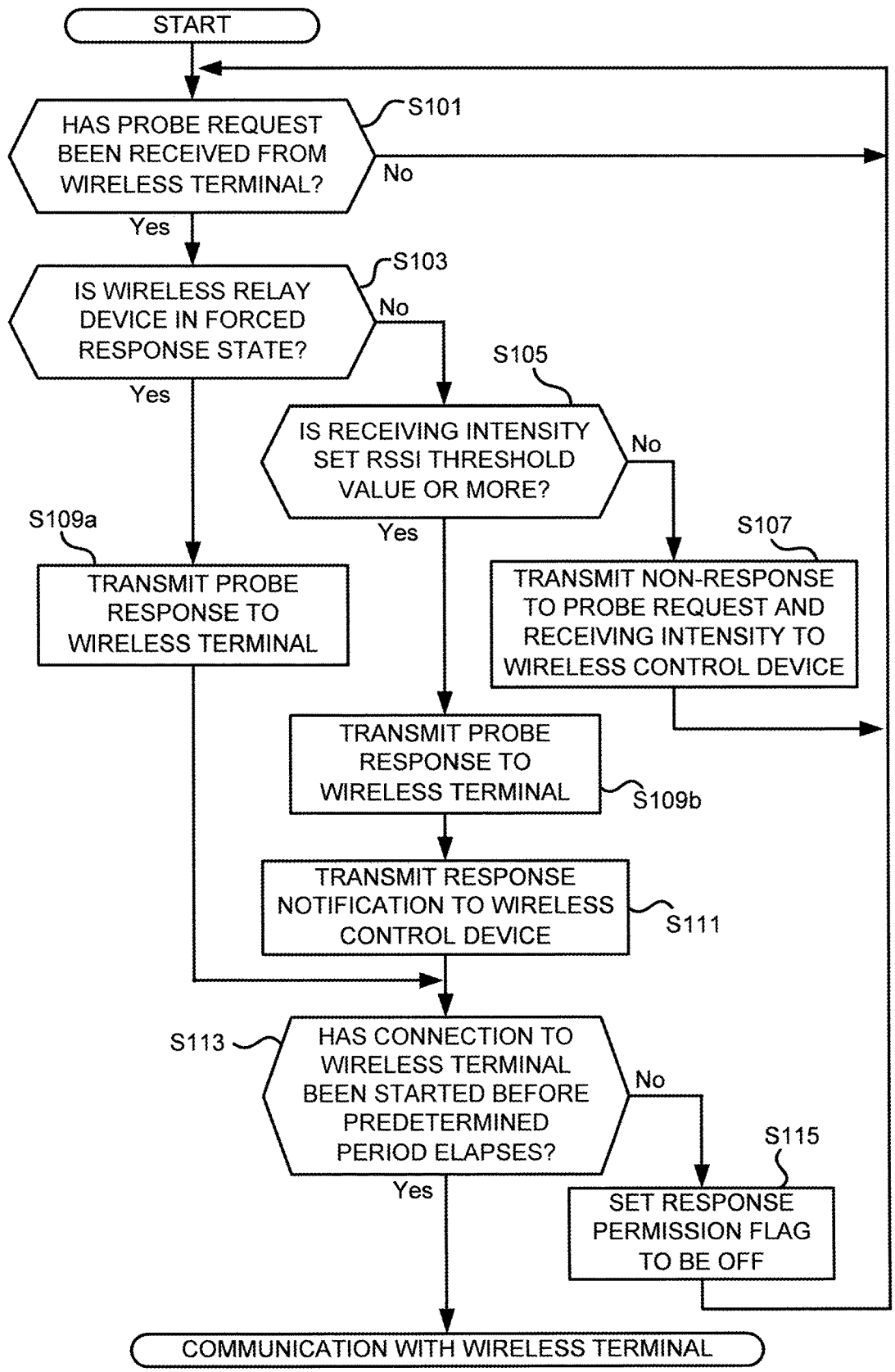
FIG. 3 is a flowchart illustrating an operation of the wireless relay device according to the one embodiment of the present invention.

An operation of the wireless relay device 3 will be described below with reference to FIG. 3. FIG. 3 is a flowchart illustrating the operation of the wireless relay device 3 according to the one embodiment of the present invention.

First, it is determined whether the first receiving unit 321 in the wireless relay device 3 has received a Probe Request (a search signal) from the wireless terminal 2 (step S101). If the first receiving unit 321 in the wireless relay device 3 has not received the Probe Request from the wireless terminal 2 (No in step S101), the processing is repeated.

If the first receiving unit 321 in the wireless relay device 3 has received the Probe Request from the wireless terminal 2 (Yes in step S101), it is determined whether a state of the wireless relay device 3 is a forced response state (step S103). The forced response state means a state where when a Probe Request is received from the wireless terminal 2, a Probe Response needs to be transmitted to the wireless terminal 2. If the instruction receiving unit 323 in the wireless relay device 3 has received an instruction to transmit a response signal from the instruction transmission unit 45 in the wireless control device 4, for example, the state of the wireless relay device 3 is the forced response state. If the state of the wireless relay device 3 is the forced response state (Yes in step S103), the first transmission unit 311 in the wireless relay device 3 transmits the Probe Response to the wireless terminal 2 (step S109a).

If the state of the wireless relay device 3 is not the forced response state (No in step 103), the comparison unit 36 determines whether a receiving intensity of the Probe Request (search signal) received by the wireless relay device 3 is a previously set RSSI threshold value or more (step S105). If the receiving intensity of the Probe Request is the previously set RSSI threshold value or more (Yes in step 105), the first transmission unit 311 in the wireless relay device 3 transmits a Probe Response to the wireless terminal 2 (step S109b).

If the receiving intensity of the Probe Request is less than the previously set RSSI threshold value (No in step 105), the second transmission unit 313 in the wireless relay device 3 transmits to the wireless control device 4 a signal indicating that there is no response to the Probe Request from the wireless terminal 2 (step S107), and the processing returns to step S101.

After the wireless relay device 3 transmits the Probe Response to the wireless terminal 2 in step S109b, the second transmission unit 313 in the wireless relay device 3 transmits to the wireless control device 4 a signal indicating that there is a response signal (a response notification signal) (step S111).

Then, it is determined whether the wireless relay device 3 itself has started to connect to the wireless terminal 2 before a predetermined period elapses (step S113). If the wireless relay device 3 has not started to connect to the wireless terminal 2 before the predetermined period elapses (No in step S113), the wireless relay device 3 sets a response permission flag to be off (step S115), and the processing returns to step S101. On the other hand, if the wireless relay device 3 has started to connect to the wireless terminal 2 before the predetermined period elapses (Yes in step S113), the wireless relay device 3 communicates with the wireless terminal 2.

Although an example of the operation of the wireless relay device 3 has been described above, the operation is not limited to the foregoing. Although the Probe Response is transmitted to the wireless terminal 2 in steps S111 in the above-described example of the operation, for example, a connection permission signal may be transmitted to the wireless terminal 2 instead of the Probe Response.

[Operation of Wireless Control Device]

Figure 4:
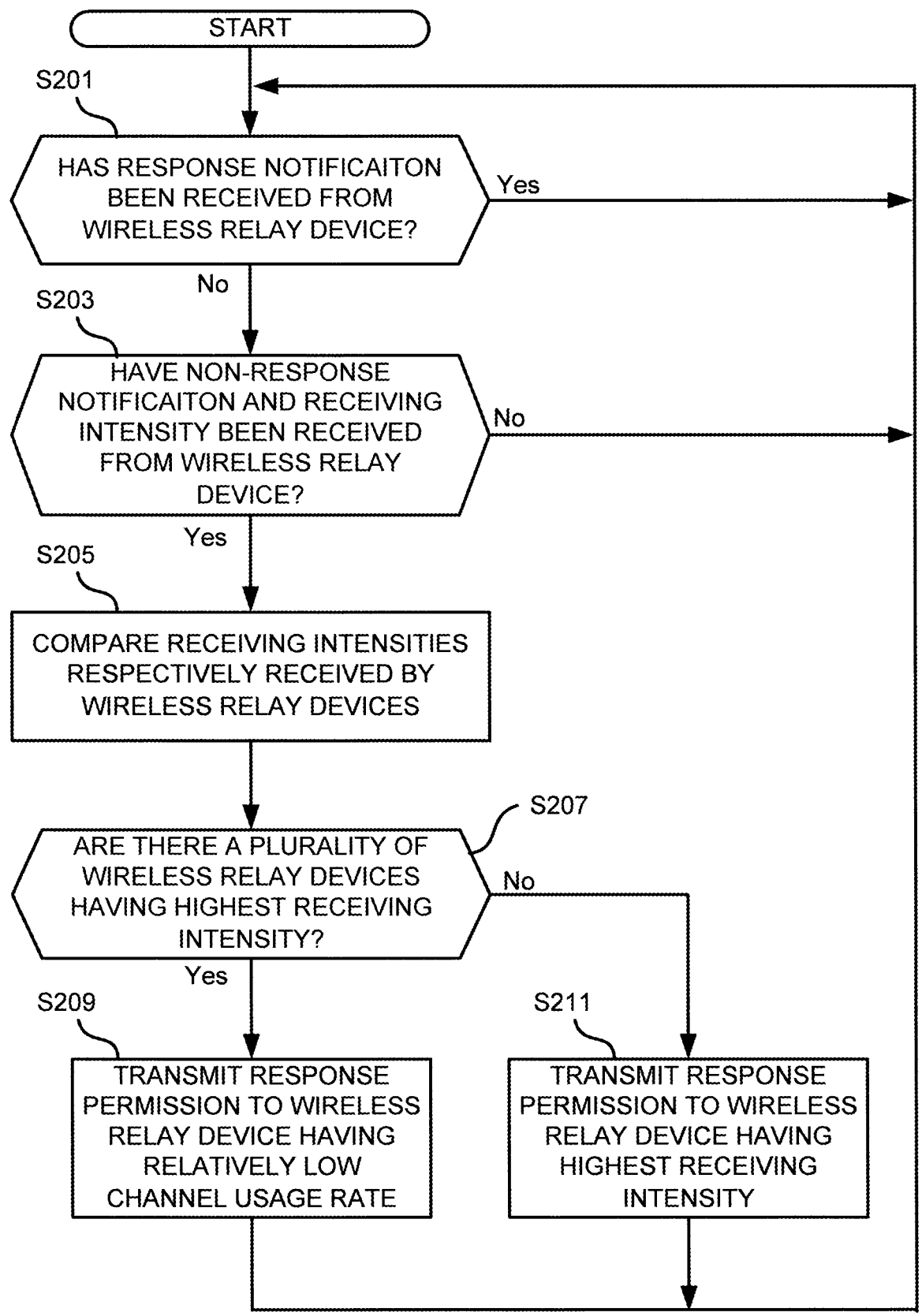
FIG. 4 is a flowchart illustrating an operation of the wireless control device according to the one embodiment of the present invention.

An operation of the wireless control device 4 will be described with reference to FIG. 4. FIG. 4 is a flowchart illustrating the operation of the wireless control device 4 according to the one embodiment of the present invention.

First, it is determined whether the receiving unit 41 in the wireless control device 4 has received a response notification from the wireless relay device 3 (step S201). If the receiving unit 41 in the wireless control device 4 has not received the response notification (No in step S201), it is determined whether the receiving unit 41 has received from each of the wireless relay devices 3 a signal indicating that there is no response and information about an RSSI value of a Probe Request received from the wireless terminal 2 by the wireless relay device 3 (step S203). If the receiving unit 41 has not received the information (No in step S203), the processing returns to step S201.

If the receiving unit 41 has received the information (Yes in step S203), the RSSI comparison unit 43 in the wireless control device 4 compares the RSSI values of the Probe Requests respectively received by the wireless relay devices 3, and determines the highest RSSI value (step S205).

Then, the wireless control device 4 determines whether the RSSI values of the Probe Requests respectively received by the plurality of wireless relay devices 3 are the highest (step S207). If the RSSI value of the Probe Request received by the one wireless relay device 3 is the highest (No in Step S207), the instruction transmission unit 45 in the wireless control device 4 transmits an instruction to transmit a response signal (a response permission) to the corresponding wireless relay device 3 (step S211), and the processing returns to step S201.

On the other hand, if the RSSI values of the Probe Requests respectively received by the plurality of wireless relay devices 3 are the highest (Yes in step S207), the wireless control device 4 compares respective channel usage rates of the wireless relay devices 3, determines the wireless relay device 3 having the lowest channel usage rate, and then transmits the instruction to transmit the response signal (the response permission) to the wireless relay device 3 (Step S209), and the processing returns to step S201.

Although an example of the operation of the wireless relay device 4 has been described above, the operation is not limited to the foregoing. For example, in the above-described example of the operation, the wireless control device 4 compares the respective channel usage rates of the wireless relay devices 3, selects the wireless relay device 3 having the lowest channel usage rate, and then transmits the instruction to transmit the response signal (the response permission) to the wireless relay device 3 in step S209. As a method of selecting one of the plurality of wireless relay devices 3, the numbers of wireless terminals 2 respectively connected to the wireless relay devices 3 may be compared to select the wireless relay device 3 to which the smallest number of wireless terminals 2 have been connected, or respective traffics on the wired side of the wireless relay devices 3 may be compared to select the wireless relay device 3 having the low traffic.

[Operation Example 1]

Figure 5A:
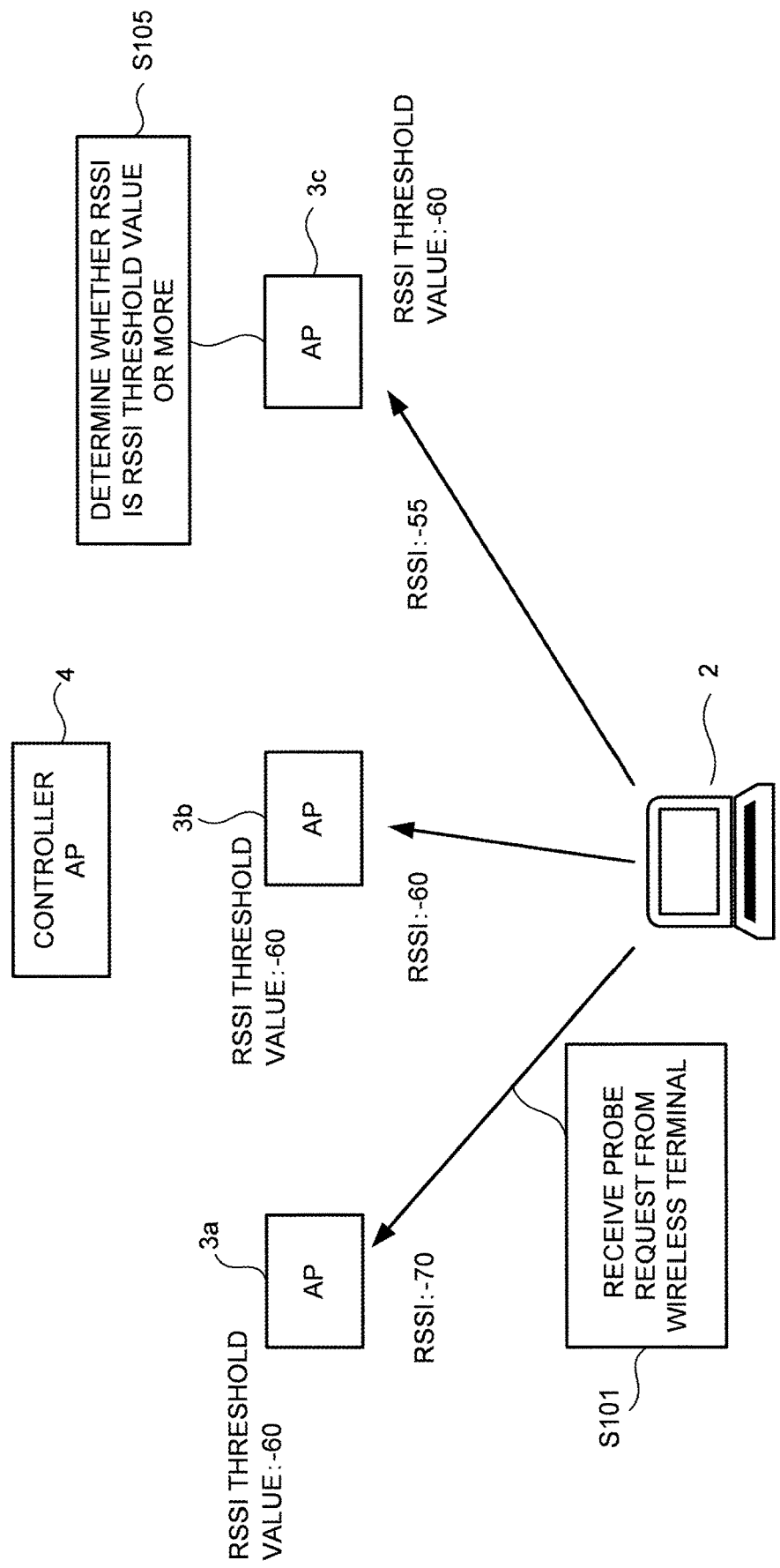
FIG. 5A is a block diagram illustrating a part of an operation of the wireless relay devices according to the one embodiment of the present invention.
Figure 5B:
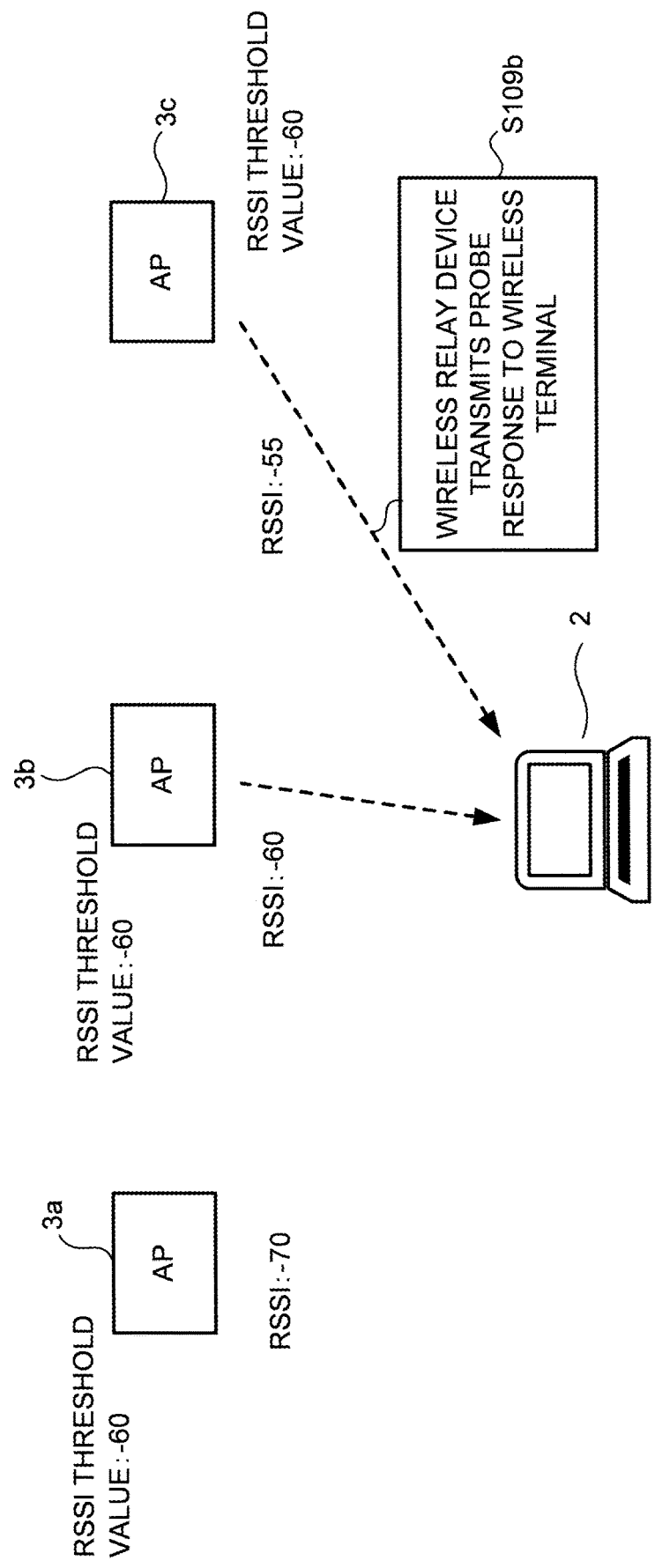
FIG. 5B is a block diagram illustrating a part of the operation of the wireless relay devices according to the one embodiment of the present invention.

An example of respective operations of the wireless relay devices 3 and the wireless control device 4 performed when at least one of RSSI values of Probe Requests respectively received from the wireless terminal 2 by the plurality of wireless relay devices 3 is a previously set RSSI threshold value or more will be described with reference to FIGS. 5A and 5B. FIGS. 5A and 5B are block diagrams each illustrating a part of the operation of the wireless relay devices 3 according to the one embodiment of the present invention.

The RSSI threshold value of each of the wireless relay devices 3a, 3b, and 3c is previously set to −60 dBm. In this state, each of the wireless relay devices 3a, 3b, and 3c receives the Probe Request from the wireless terminal 2 (step S101). Then, the comparison unit 36 in the wireless relay device 3a determines whether an RSSI value (−70 dBm) of the Probe Request received from the wireless terminal 2 is the previously set RSSI threshold value (−60 dBm) or more (step S105). The comparison units 36 in the wireless relay devices 3b and 3c respectively perform similar determinations. As a result, the comparison units 36 in the wireless relay devices 3b and 3c respectively determine that RSSI values (−60 dBm and −55 dBm in this order) of the Probe Requests received from the wireless terminal 2 are the previously set RSSI threshold value (−60 dBm) or more. The first transmission units 311 in the wireless relay devices 3b and 3c respectively transmit Probe Responses to the wireless terminal 2 (step S109b). On the other hand, the first transmission unit 311 in the wireless relay device 3a does not transmit a Probe Response to the wireless terminal 2. Operations in step S109b and subsequent steps are as described in FIG. 3.

[Operation Example 2]

An example of respective operations of the wireless relay devices 3 and the wireless control device 4 performed when an RSSI value of a Probe Request received from the wireless terminal 2 by each of the wireless relay devices 3 is less than a previously set RSSI value will be described with reference to FIGS. 6A and 6B. FIGS. 6A and 6B are block diagrams each illustrating a part of the operation of the wireless relay devices 3 according to the one embodiment of the present invention.

The RSSI threshold value of each of the wireless relay devices 3a, 3b, and 3c is previously set to −60 dBm. In this state, each of the wireless relay devices 3a, 3b, and 3c receives the Probe Request from the wireless terminal 2 (step S101). The RSSI values of the Probe Requests respectively received from the wireless terminal 2 by the wireless relay devices 3a, 3b, and 3c are −70 dBm, −65 dBm, and −61 dBm in this order. The values are all less than the previously set RSSI threshold value (−60 dBm). In this case, the second transmission unit 313 in each of the wireless relay devices 3a, 3b, and 3c transmits to the wireless control device 4 a signal indicating that there is no response to the Probe Request from the wireless terminal 2 and the RSSI value of the Probe Request (step S107).

The RSSI comparison unit 43 in the wireless control device 4, which has respectively received from the wireless relay devices 3a, 3b, and 3c the signals indicating that there is no response to the Probe Requests from the wireless terminal 2 and the RSSI values of the Probe Requests, compares the RSSI values. When the RSSI values are compared with one another, the RSSI value of the Probe Request received by the wireless relay device 3c is −61 dBm, which is the highest RSSI value. The instruction transmission unit 45 in the wireless control device 4 transmits an instruction to transmit a Probe Response to the wireless relay device 3c. The instruction receiving unit 323 in the wireless relay device 3c receives the instruction. A state of the wireless relay device 3c is a forced response state (Yes in step S103).

When each of the wireless relay devices 3a, 3b, and 3c then receives a Probe Response from the wireless terminal 2 (step S101), as illustrated in FIG. 6B, the first transmission unit 311 in the wireless relay device 3c in the forced response state transmits the Probe Response to the wireless terminal 2 (step S109a). Operations in step S109a and subsequent steps are as described in FIG. 3.

In the wireless communication system including the wireless control device and the plurality of wireless relay devices, the examples of the respective operations of the wireless control device 4 and the wireless relay devices 3a, 3b, and 3c have been described above.

In the present embodiment, when the RSSI threshold value is set in each of the wireless relay devices 3, the wireless terminal 2 can communicate with and connect to the wireless relay device 3 providing a good communication environment. Therefore, the present embodiment produces an effect of making a situation where the wireless terminal 2 connects to the far wireless relay device 3 having a weak radio wave avoidable and making efficient use of a wireless channel implementable.

In the present embodiment, determination of an optimum path in a communication partner or a crossover node is not required, unlike in the conventional technique, because the RSSI threshold value is set in each of the wireless relay devices 3 so that the wireless terminal 2 can communicate with and connect to the wireless relay device 3 having a good communication environment. A relay node is not required, unlike in the conventional technique. Therefore, the present embodiment produces an effect of making highly efficient communication implementable in a simpler configuration.

Furthermore, in the present embodiment, each of the wireless relay devices 3 transmits to the wireless control device 4 the information about whether the wireless relay device 3 has responded to the Probe Request from the wireless terminal 2. If the wireless control device 4 has respectively received signals indicating that there is no response from all the wireless relay devices 3, the wireless relay device 3 having the highest one of the RSSI values of the Probe Requests respectively received by the wireless relay devices 3 is selected, and the instruction to transmit the Probe Response is transmitted to the selected wireless relay device 3. The present embodiment produces an effect of making a situation where the wireless terminal 2 cannot communicate with and connect to any one of the wireless relay devices 3 avoidable by thus transmitting from each of the wireless relay devices 3 to the wireless control device 4 the information about whether the wireless relay device 3 has responded to the Probe Request from the wireless terminal 2.

[Configuration of Wireless Device]

Figure 7:
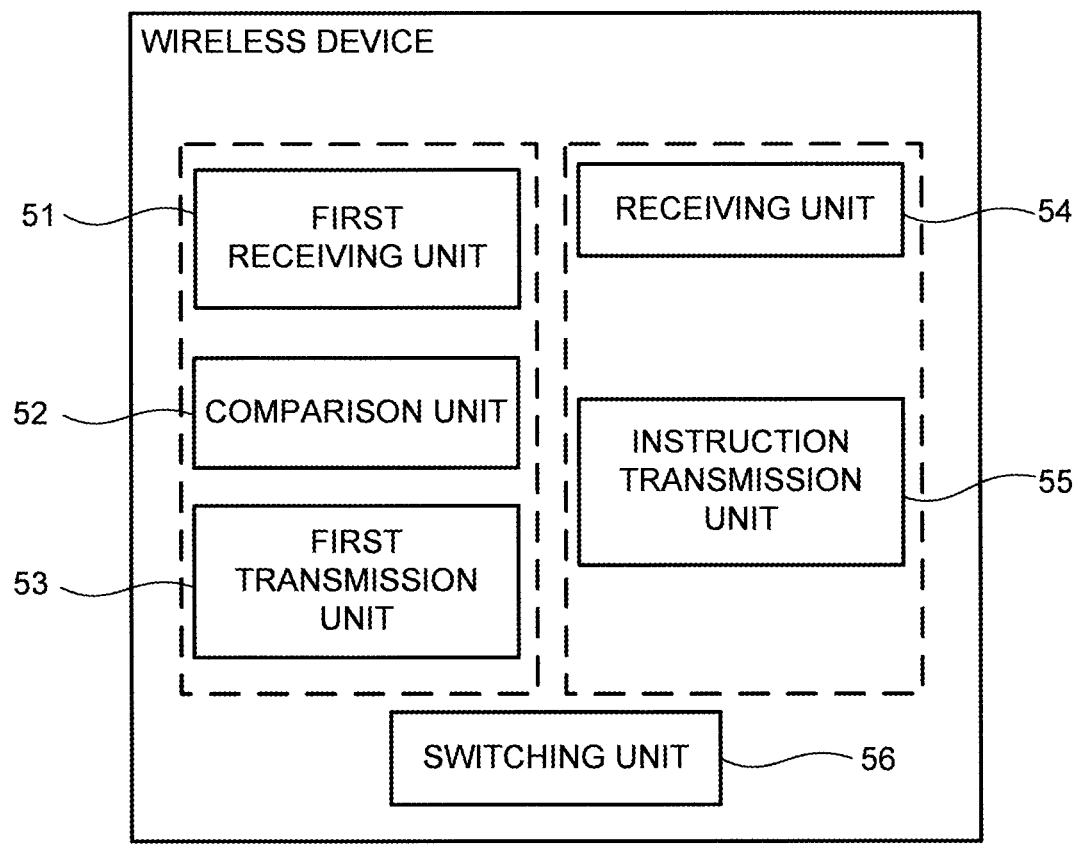
FIG. 7 is a block diagram illustrating a configuration of a wireless device according to another embodiment of the present invention.

FIG. 7 is a block diagram illustrating a configuration of a wireless device according to another embodiment of the present invention. A wireless device 5 includes a first receiving unit 51, a comparison unit 52, a first transmission unit 53, a receiving unit 54, an instruction transmission unit 55, and a switching unit 56. The first receiving unit 51, the comparison unit 52, and the first transmission unit 53 respectively correspond to the first receiving unit 321, the comparison unit 36, and the first transmission unit 311 in the wireless relay device 3 illustrated in FIG. 2. Similarly, the receiving unit 54 and the instruction transmission unit 55 respectively correspond to the receiving unit 41 and the instruction transmission unit 45 in the wireless control device 4 illustrated in FIG. 2. The switching unit 56 operates one, a function of which has been stopped, of the wireless relay device 3 and the wireless control device 4 and stops a function of the other device. In this example, the function of the wireless relay device 3 is implemented by the first receiving unit 51, the comparison unit 52, and the first transmission unit 53, and the function of the wireless control device 4 is implemented by the receiving unit 54 and the instruction transmission unit 55. The switching instruction is received from a manager PC (personal computer). In this example, switching between both the devices is performed by software.

Although the wireless device 5 has been described as including the respective minimum configurations of the wireless relay device 3 and the wireless control device 4 illustrated in FIG. 2 and the switching unit 56, the wireless device 5 may include the other components in the wireless relay device 3 and the wireless control device 4.

The present invention is not limited to the above-described embodiments, and can be appropriately changed without departing from the scope and spirit of the invention.

What is claimed is:

1. A wireless communication method comprising:

operating one function that has been stopped, among first and second functions corresponding to a wireless device, and stopping the other function, among the first and second functions, in response to a switching instruction, wherein the wireless device according to the first function:
receiving a broadcast signal from a wireless terminal;
comparing a receiving intensity of the received broadcast signal with a predetermined set value;
transmitting, to the wireless terminal, a first signal indicating that the wireless terminal is able to start connection;
transmitting, to a wireless control device, first information about presence or absence of a response signal corresponding to presence or absence of transmitting the first signal to the wireless terminal; and
receiving, from the wireless control device, an instruction to transmit the first signal to the wireless terminal after transmitting the first information to the wireless control device,
wherein the first signal is transmitted to the wireless terminal upon the result of the comparing indicates that the received broadcast signal is stronger than the predetermined set value regardless of whether the instruction from the wireless control device is received, wherein the wireless device according to the second function:
receiving, from a plurality of wireless relay devices, the first information and second information about the intensity of the broadcast signal received from the wireless terminal respectively by each of the plurality of wireless relay devices;
transmitting, in a case where the first information received from each of the plurality of wireless relay devices indicates absence of the respective response signal, to one wireless relay device, among the plurality of wireless relay devices, based on the second information, the instruction to transmit the first signal to the one wireless relay device; and
not transmitting, in a case where the first information received from each of the plurality of wireless relay devices indicates presence of the respective response signal, the instruction to any of the plurality of wireless relay devices.

2. The wireless communication method according to claim 1, wherein the transmitting of the first signal by the wireless device according to the first function includes:
transmitting the response signal to the wireless terminal; or
transmitting a connection permission signal to the wireless terminal.

3. The wireless communication method according to claim 1, further comprising the wireless device according to the first function resetting, in a case where a predetermined condition is not satisfied after receiving the instruction, from a state where the first signal is transmittable to a state where the instruction has not been received yet.

4. The wireless communication method according to claim 3, wherein the predetermined condition is starting connection to the wireless terminal before a predetermined period elapses since the instruction was received.

5. The wireless communication method according to claim 1, wherein the predetermined set value is set from the wireless control device.

6. The wireless communication method according to claim 1, wherein the wireless device is a wireless access point.

7. The wireless communication method according to claim 1, wherein the instruction to transmit the first signal is an instruction to transmit a response signal to the wireless terminal or an instruction to transmit a connection permission signal to the wireless terminal.

8. The wireless communication method according to claim 1, wherein each of the broadcast signals includes an identifier for identifying a specific wireless relay device among the plurality of wireless relay devices.

9. The wireless communication method according to claim 1, further comprising the wireless device according to the second function setting in the at least one wireless relay device a value representing the receiving intensity of the broadcast signal.

10. The wireless communication method according to claim 1, wherein each of the broadcast signals includes an identifier with a set value for identifying a specific wireless relay device among the plurality of wireless relay devices.

11. The wireless communication method according to claim 1, wherein the predetermined set value is set from the wireless control device.

12. The wireless communication method according to claim 1, further comprising the wireless device according to the first function transmitting, to the wireless control device, the second information, in a case where the first information transmitted to the wireless control device indicates absence of the response signal.

13. The wireless communication method according to claim 1, further comprising the wireless device according to the second function:
comparing respective intensities of the broadcast signals from the plurality of wireless relay devices,
wherein the one wireless relay device has a highest intensity among the plurality of wireless relay devices.

14. A wireless communication system comprising:
a wireless control device; and
a plurality of wireless relay devices each that:
receive a broadcast signal from a wireless terminal;
compare a receiving intensity of the received broadcast signal with a predetermined set value;
transmit, to the wireless terminal, a first signal indicating that the wireless terminal is able to start connection;
transmit, to the wireless control device, first information about presence or absence of a response signal corresponding to presence or absence of transmitting the first signal to the wireless terminal; and
receive, from the wireless control device, an instruction to transmit the first signal to the wireless terminal after transmitting the first information to the wireless control device,
wherein the first signal is transmitted to the wireless terminal upon the result of the comparison indicates that the received broadcast signal is stronger than the predetermined set value regardless of whether the instruction from the wireless control device is received, and
wherein the wireless control device comprises a memory and a processor configured to:
receive, from the plurality of wireless relay devices, the first information and second information about the intensity of the broadcast signal received from the wireless terminal respectively by each of the plurality of wireless relay devices;
transmit, in a case where the first information received from each of the plurality of wireless relay devices indicates absence of the respective response signal, to one wireless relay device, among the plurality of wireless relay devices, based on the second information, the instruction to transmit the first signal to the one wireless relay device; and not transmit, in a case where the first information received from each of the plurality of wireless relay devices indicates presence of the respective response signal, the instruction to any of the plurality of wireless relay devices, wherein each of the wireless relay devices transmits, to the wireless control device, the first information and the second information, and wherein the one wireless relay device transmits to the wireless terminal the first signal upon receiving the broadcast signal from the wireless terminal.

* * * * *